Dec. 18, 1934.　　　　R. K. LEE　　　　1,984,413
VIBRATION DAMPER FOR VEHICLE PROPELLING APPARATUS
Filed Dec. 17, 1930
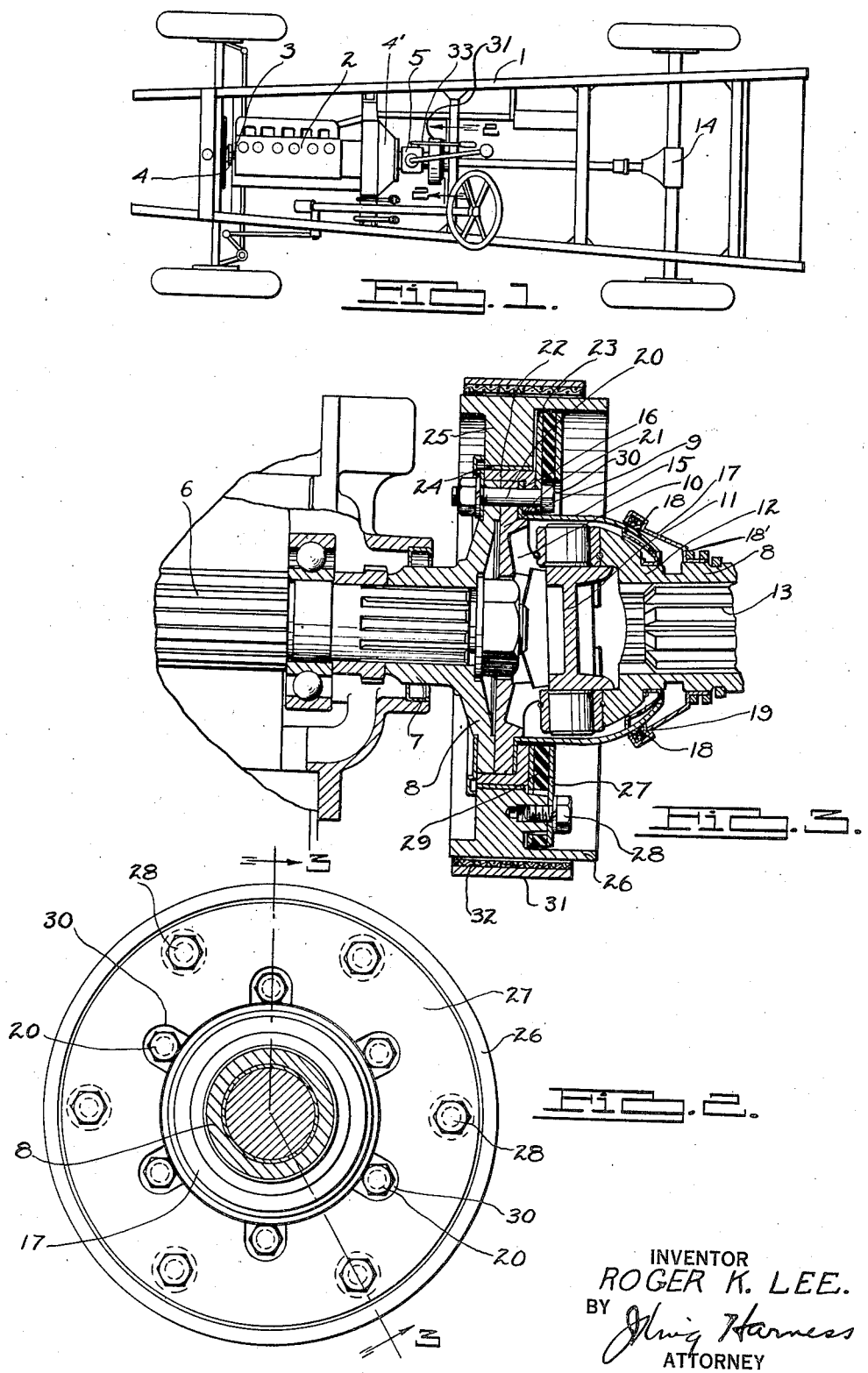
INVENTOR
ROGER K. LEE.
BY
ATTORNEY Patented Dec. 18, 1934

1,984,413

UNITED STATES PATENT OFFICE 1,984,413

VIBRATION DAMPER FOR VEHICLE PROPELLING APPARATUS

Roger K. Lee, Highland Park, Mich., assignor to Chrysler Corporation, Detroit, Mich., a corporation of Delaware Application December 17, 1930, Serial No. 503,057

6 Claims. (Cl. 188—2)

This invention relates to apparatus for reducing the objectionable vibrations in a vehicle which are created by the rotating mechanism thereof, particularly the transmission and main driving shaft of the propelling apparatus.

The main objects of the invention are to provide, in vehicle propelling mechanism, a vibration damper which operates upon the vehicle transmission and main driving shaft independently of the crank shaft; to provide means of this kind at the universal joint that connects the transmission and main shaft together, so as to avoid synchronous vibration of the parts of the joint; to provide a vibration damper for the transmission mechanism which operates thereon when the clutch of the propelling apparatus is engaged during driving and when the clutch is disengaged during coasting of the vehicle.

Further objects of the invention are to provide an improved vibration damper of the type which includes a yieldably mounted inertia member; to provide a hub structure on the main driving shaft of a vehicle having a journal portion for rotatably supporting the inertia member; to provide an inertia member which has an outer periphery that serves as a yieldable brake drum, to provide an element in the structure which is adapted to yieldably hold the inertia member against severe rotation relative to the rotating parts of the transmission and main shaft so as to prevent chattering during brake applications; to provide a yieldable connection of this kind which, when relaxed, is sufficiently sensitive to damping vibrations of the character that are created by rotation of the main shaft and rotatable transmission parts, and which when tensioned, is sufficiently rigid to effectively transmit the braking force that is applied on the inertia member to the main shaft.

An illustrative embodiment of the invention is shown in the accompanying drawing, in which:

Fig. 1 is a top plan view of a vehicle chassis embodying my invention.

Fig. 2 is a transverse vertical section taken on the line 2—2 of Fig. 1.

Fig. 3 is a vertical section taken on the line 3—3 of Fig. 2.

In the form shown, my improved combination vibration damper and yieldably mounted brake drum is illustrated in conjunction with the propelling apparatus of a vehicle chassis 1 and a motor 2 having a crank shaft 3 on the forward end of which is mounted a vibration damper 4 of the type used in preventing synchronous vibration of the crank shaft during operation. The motor is connected by a conventional vehicle main clutch 4' to propelling apparatus of the vehicle which includes a transmission 5 of conventional construction having a driven shaft 6 which extends through the casing of the transmission and on which is splined a collar 7 having a radial flange 8. Registering with the radial flange 8 is a radial flange 9 of a universal joint element 10 on which the cross 11 of the universal joint is pivotally mounted. The cross 11 is also pivotally attached to a universal coupling element 12 which is splined on the main driving shaft 13 of the propelling apparatus that extends rearwardly to the differential 14 of the propelling apparatus.

The universal joint is enclosed within a casing which includes a forward section 15 having a radial flange 16 located adjacent the flange 9 of the universal joint element 10, and a rearward section 17 which is secured to a collar 18' on the rear universal joint element 12 and which receives the rear end portion of the section 15 of the casing. The rearward section 17 of the casing is provided with a groove 18 in which is seated a felt gasket or washer 19 that frictionally engages the outer surface of the forward section 15 of the casing and forming a substantially grease tight seal.

The flanges 8 and 9 of the universal joint element 10 are secured together by bolts 20 which also extend through registering apertures, in the radial flange 16 of the forward section 15 of the casing and in a side member or flange 21 of a sleeve 22 that is concentrically mounted on the outer peripheries of the flanges 8 and 9. The bolts 20 hold the flanges 8, 9, 16 and 21 together in a firmly clamped relation and they also secure to the universal joint, a flat ring-like disc or plate 23.

Concentrically mounted on the sleeve 22 is a journal or bearing member 24 on which is seated an inertia element 25 having an integral outer web 26 which serves as a brake drum. The inertia member 25 is yieldably secured against rotation relative to the universal joint by a flat ring-like disc or plate 27 which is rigidly attached to the inertia member by bolts 28, and yieldably connected with the ring-like plate 23 by a yieldable, resilient medium 29. The yieldable medium preferably comprises a layer of rubber which is located between the two plates and rigidly bonded by vulcanization, or secured in any suitable manner, to the adjacent surfaces of the ring-like plates 23 and 27. The outer plate 27 is provided with apertures 30 which register with the heads of the bolts 20 permitting a purchase to be obtained on the same by a wrench or other suitable tool.

Concentrically surrounding the peripheral web 26 of the inertia member is a brake band 31 having a brake lining 32 which is adapted to be applied by braking apparatus of conventional construction. The brake apparatus illustrated is employed as an emergency brake and is adapted to be controlled by an emergency brake lever 33, shown in Fig. 1, in a manner which is conventional in present vehicle constructions.

In operation, the inertia member which is yieldably connected to the universal joint, lags in responding to variations in the rate of vibration occurring in the transmission, universal joint and main shaft and in this way obviates synchronous vibrations in these members of the vehicle propelling apparatus during operation. The transmission, universal joint and main shaft damper may operate in conjunction with the vibration damper on the crank shaft of the engine when the clutch of the vehicle is engaged, but when the clutch is disengaged, the former vibration damper functions independently of the vibration damper on the crank shaft and successfully reduces synchronous vibration in the transmission, universal joint and drive shaft when these parts are driven during coasting of the vehicle.

The yieldable element by which the plates 23 and 27 of the structure shown in the drawing are connected together, has sufficient rigidity to prevent severe rotation of the inertia member, which also serves as a brake drum, relative to the structure upon which it is mounted so that during application of the brake band 31, the braking force is effectively transmitted to the main drive shaft and from the latter to the rear wheels of the vehicle. During application of the brake band 31, the rubber connecting member 29 is tensioned, permitting a limited amount of rotation of the combined inertia member and brake drum relative to the main shaft 13, obviating the tendency of the brake band to grip and chatter during its initial application to the drum portion of the inertia member. When the rubber element 29 is relaxed, as for example, during normal running of the vehicle; it is sufficiently yieldable and sensitive in its action to permit that degree of rotation of the inertia member relative to the universal joint which is required in reducing synchronous vibrations in the propelling mechanism.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. In a vehicle having brake mechanism, propelling apparatus including a driving means, transmission mechanism and driven means and engageable by said brake mechanism, a brake drum having a substantial mass mounted on said driven means, and means secured both to said brake drum and driven means having a yieldable member adapted to hold said drum against severe rotation relative to said driven means during brake applications and to permit slight relative rotation of said driven means and brake drum for opposing synchronous vibrations in said transmission and driving and driven means during operation thereof.

2. In a vehicle having brake mechanism; a propelling apparatus including a transmission, main shaft and a universal joint flexibly connecting the same together; a radial flange on said universal joint; a sleeve mounted on the periphery of said flange; an inertia member journaled on said sleeve; a pair of spaced plates at one side of said inertia member, one rigidly secured to the latter, means rigidly holding the other plate fixed with respect to said flange; a yieldable rubber medium located between said plates and vulcanized thereto adapted to permit limited rotation of said inertia member relative to said joint for opposing synchronous vibrations in said joint, transmission and main shaft; and a brake drum integral with said inertia member and engageable by said brake mechanism.

3. In a vehicle having brake mechanism, propelling apparatus including a power unit and a main drive shaft, and means for dampening torsional vibration in said shaft and power unit including relatively movable hub and inertia elements and having a rubber connecting element for resiliently connecting movement of said inertia element relative to said hub element, said hub element being fixed to said shaft and said inertia element having means for coacting with said brake mechanism so as to yieldably apply the rotation retarding action thereof on said main shaft by said rubber element.

4. In a vehicle having brake mechanism including a frictional rotation retarding element; propelling apparatus including transmission mechanism, a propelling shaft and a universal joint therebetween including pivotally connected elements, bearing means on one of said elements; a brake drum engageable by said frictional element having a substantial mass journaled on said bearing means and rotatable relative to both said transmission mechanism and said propelling shaft; and means secured to said propeller shaft and said brake drum having a yieldable member adapted to hold said brake drum against severe rotation relative to said shaft during brake applications and to permit slight relative rotation of said drum and shaft for opposing synchronous vibrations during operation of said propelling apparatus.

5. In a vehicle having brake mechanism including a releasable frictional rotation retarding element; propelling apparatus including a motor having transmission mechanism, a main drive shaft and a universal connecting element between said transmission mechanism and said main drive shaft; a bearing on said universal connecting element; an inertia member journaled on said bearing and rotatable relative to said transmission mechanism and said drive shaft; yieldable means having spaced extremities fixed with respect to said inertia element and said universal connecting element respectively for limiting rotation of said inertia element relative to said transmission mechanism and said main drive shaft; and a brake drum carried by said inertia element and engageable by said frictional element.

6. In a vehicle having brake mechanism including a frictional rotation retarding element; propelling apparatus including a transmission mechanism, a propelling shaft and a universal joint therebetween including pivotally connected elements; bearing means on one of said elements; a brake drum engageable by said frictional element having a substantial mass journaled on said bearing means; and means fixed with respect to one of said universal joint elements and secured to said brake drum having a yieldable member adapted to hold said brake drum against severe rotation relative to said joint during brake applications and to permit slight relative rotation of said drum and joint for opposing synchronous vibrations during operation of said propelling apparatus.

ROGER K. LEE.

CERTIFICATE OF CORRECTION.

Patent No. 1,984,413. December 18, 1934.

ROGER K. LEE.

It is hereby certified that error appears in the printed specification of the above numbered patent requiring correction as follows: Page 2, first column, lines 53 and 54, claim 1, strike out the words "and engageable by said brake mechanism" and insert the same after "means" first occurrence in line 56, of said claim; and that the said Letters Patent should be read with this correction therein that the same may conform to the record of the case in the Patent Office.

Signed and sealed this 13th day of August, A. D. 1935.

Leslie Frazer (Seal)

Acting Commissioner of Patents.